(12) United States Patent
Hashimoto et al.

(10) Patent No.: US 10,290,409 B2
(45) Date of Patent: May 14, 2019

(54) SOFT MAGNETIC COMPONENT FOR TORQUE SENSOR AND TORQUE SENSOR USING THE SAME

(71) Applicant: HITACHI METALS, LTD., Tokyo (JP)

(72) Inventors: Akinori Hashimoto, Suita (JP); Akio Morishita, Suita (JP)

(73) Assignee: HITACHI METALS, LTD., Tokyo (JP)

( * ) Notice: Subject to any disclaimer, the term of this patent is extended or adjusted under 35 U.S.C. 154(b) by 263 days.

(21) Appl. No.: 15/269,084

(22) Filed: Sep. 19, 2016

(65) Prior Publication Data

US 2017/0004911 A1    Jan. 5, 2017

Related U.S. Application Data

(63) Continuation of application No. PCT/JP2015/056810, filed on Mar. 9, 2015.

(30) Foreign Application Priority Data

Mar. 28, 2014 (JP) ................................ 2014-068550

(51) Int. Cl.
*B62D 5/04* (2006.01)
*G01L 3/10* (2006.01)
*H01F 1/147* (2006.01)

(52) U.S. Cl.
CPC ....... *H01F 1/14708* (2013.01); *B62D 5/0481* (2013.01); *G01L 3/103* (2013.01)

(58) Field of Classification Search
CPC ... H10F 1/14758; H10F 1/14741; G10L 3/103
See application file for complete search history.

(56) References Cited

U.S. PATENT DOCUMENTS

| 6,376,108 | B1 | 4/2002 | Otagiri et al. |
| 7,323,214 | B2 * | 1/2008 | Wakayama ............... H01F 1/18 427/127 |
| 7,415,898 | B2 | 8/2008 | Ishihara et al. |

FOREIGN PATENT DOCUMENTS

| CN | 101334324 A | 12/2008 |
| DE | 199 00 351 A1 | 7/2000 |
| EP | 1 197 569 A1 | 4/2002 |
| EP | 2 407 766 A1 | 1/2012 |
| JP | 63-60264 A | 3/1988 |
| JP | 64-68982 A | 3/1989 |
| JP | 7-166281 A | 6/1995 |
| JP | 7-197220 A | 8/1995 |
| JP | 2000-235911 A | 8/2000 |
| JP | 2003-309007 A | 10/2003 |
| JP | 2005-265581 A | 9/2005 |
| JP | 2010-91316 A | 4/2010 |

OTHER PUBLICATIONS

Extended (supplementary) European Search Report dated Jan. 9, 2018, issued in counterpart European Application No. 15769348.2. (7 pages).
International Search Report dated Apr. 14, 2015, issued in counterpart international application No. PCT/JP2015/056810 (3 pages).
Office Action dated Feb. 7, 2017, issued in counterpart Japanese Patent Application No. 2016-510206, with English translation. (15 pages).
Office Action dated Jun. 14, 2018, issued in counterpart Chinese Application No. 201580016413.1, with English translation. (12 pages).
Office Action dated Nov. 23, 2018, issued in counterpart Chinese application No. 201580016413.1, with English translation. (13 pages).
Wang Zhendong, "Induction Furnace Smelting Technology", China Machine Press, Jan. 2012, 1st Edition. (15 pages). (A concise explanation of relevance for this document is provided in the Chinese Office Action dated Nov. 23, 2018).

* cited by examiner

*Primary Examiner* — C Melissa Koslow
(74) *Attorney, Agent, or Firm* — Westerman, Hattori, Daniels & Adrian, LLP

(57) ABSTRACT

A soft magnetic component for a torque sensor, formed by resin-molding a soft magnetic material that contains Ni, Fe in such an amount that Fe/(Fe+Ni) is within a range from 10.0% to 16.0% in terms of mass ratio, and 3.5% by mass to 7.5% by mass of M (the M represents one or more elements selected from among Mo, Nb, Cr, Cu, Ti, and W) and has a saturation magnetostriction of at least −4.0 ppm and less than 0 ppm, is provided.

15 Claims, 4 Drawing Sheets

SOFT MAGNETIC COMPONENT FOR TORQUE SENSOR AND TORQUE SENSOR USING THE SAME

CROSS-REFERENCE TO RELATED APPLICATIONS

This application is a continuation of PCT/JP2015/056810, Soft Magnetic Component for Torque Sensor and Torque Sensor Using the Same, Mar. 9, 2015, Akinori Hashimoto and Akio Morishita.

BACKGROUND OF THE INVENTION

Field of the Invention

The present invention relates to a soft magnetic component for a torque sensor used for detection of a torque and an angular velocity utilizing rotation of an axis, particularly, a soft magnetic component for a torque sensor used in a ring core and a yoke, and a torque sensor using the same, particularly, a torque sensor used in an electric power steering (hereinafter abbreviated to "EPS").

Description of the Background Art

The EPS is a system that properly assists a steering force by detecting the steering force from a steering wheel with a torque sensor, transmitting the detection signal as a torque signal to a control unit, and performing control of applying, to a motor, an electric current according to the torque signal. This torque sensor used in the EPS includes an input shaft coupled to the steering wheel, an output shaft coupled to a steering mechanism, a torsion bar coupling these two shafts, north poles and south poles of magnets provided around, this torsion bar, a yoke, a ring core, and a detection portion including a Hall element or the like that detects magnetic flux, for example. For example, the yoke and the ring core may be resin-molded.

In this torque sensor, application of the steering force leads to rotation of the input shaft and torsion of the torsion bar to cause angular differences between the magnets and the yoke. According to the angular differences, the magnetic flux of the magnets are transmitted from the yoke to the ring core, and are detected by the detection portion as magnetic flux proportional to the torsional angle of the torsion bar. Thus, a steering torque according to the steering force can be detected.

In general, when an external magnetic field (magnetic field) is applied, to a magnetic body, alternately also including an opposite direction, a magnetization curve (B-H curve) represented by a magnetic flux density (B) and the intensity of an external magnetic field (H) is a hysteresis curve. The gradient of the hysteresis curve is called a magnetic permeability $\mu$ (=B/H, [H/m] in International System of Units), the gradient in the vicinity of an original point is called an initial magnetic permeability $\mu i$, and the maximum gradient is called a maximum magnetic permeability $\mu m$. As a magnetic permeability, a ratio (relative magnetic permeability) of the magnetic permeability to a vacuum magnetic permeability ($\mu_0 = 4\pi \times 10^{-7}$ [H/m]) is generally used, and hence this is hereinafter followed. A magnetic body having a larger relative magnetic permeability described above is more likely to be magnetized by a weak magnetic field. Thus, in order to increase the sensitivity of the torque sensor, a magnetic body more greatly magnetized by as a weak magnetic field as possible is preferably used. More specifically, a magnetic body having a larger relative magnetic permeability is preferably used. Therefore, a coercive force (Hc) indicating the intensity of an external magnetic field necessary to reduce the magnetic flux density of the magnetic body to zero is preferably as small as possible.

For the ring core and yoke used in the torque sensor, a material defined as SUS410L, a Fe-based material having a small strain sensitivity disclosed in Patent Document 1 (Japanese Patent Application No. 2003-309007), a Fe—Ni based material having a large relative magnetic permeability and a small core loss disclosed in Patent Document 2 (Japanese Patent Application No. S63-68982), a Fe—Ni based material defined in JIS-C2531, or the like is used, for example. Particularly, permalloy C (PC), which is a Fe—Ni based material, defined in JIS-C2531, having an initial relative magnetic permeability and a maximum relative magnetic permeability increased by adding about 78 mass % of Ni and Fe and further adding Mo, Cu, Cr, etc. is excellent in sensitivity to a change in magnetic flux, and hence it is effective for improving the detection accuracy.

In recent years, for a torque sensor, resin molding has been increasingly applied to molding of a member containing a soft, magnetic material in order to reduce the number of components, reduce the man-hours, and reduce the weight, for example. Generally, when the soft magnetic material is resin-molded, a compression stress is generated inside the soft magnetic material by resin shrinkage after resin molding, the initial relative magnetic permeability, the maximum relative magnetic permeability, and the effective relative magnetic permeability are reduced as compared with before resin molding, and the coercive force is increased. In other words, the magnetic properties of a soft magnetic component containing the soft, magnetic material are degraded by resin molding. Thus, there is such a problem that the torque detection accuracy of a torque sensor using the resin-molded soft magnetic component for a torque sensor is reduced as compared with that of conventional ones by an increase in hysteresis and reductions in responsiveness and sensitivity.

SUMMARY OF THE INVENTION

An object of the present invention is to provide a soft magnetic component for a torque sensor capable of suppressing changes in the magnetic properties of a soft magnetic material before and after resin molding and contributing to improvement in the detection accuracy of the torque sensor. Another object of the present invention is to provide a torque sensor constructed of the soft magnetic component for a torque sensor, having improved detection accuracy.

The present inventors have found that the aforementioned problem can be solved by focusing on that a compression stress generated inside a soft magnetic material by resin shrinkage after resin molding causes degradation of the magnetic properties of the soft magnetic material and applying a soft magnetic material having a shrinkage property when a magnetic field is applied, and has arrived at the present invention.

More specifically, the present invention is a soft magnetic component for a torque sensor formed by resin-molding a soft magnetic material that contains Ni, Fe in such an amount that Fe/(Fe+Ni) is within a range from 10.0% to 16.0% in terms of mass ratio, and 3.5% by mass to 7.5% by mass of M (the above M represents one or more elements selected from among Mo, Nb, Cr, Cu, Ti, and W) and has a saturation magnetostriction of at least −4.0 ppm and less than 0 ppm.

According to the present invention, the above M may be Mo in an amount selected from a range of 3.5% by mass to 6.5% by mass.

Alternatively, the above M may be Nb in an amount selected from a range of 5.0% by mass to 6.5% by mass.

Alternatively, the above M may be Cr in an amount selected from a range of 3.5% by mass to 6.0% by mass.

Alternatively, the above M may be a combination of Mo in an amount selected from a range of 3.5% by mass to 5.0% by mass and Cu in an amount selected from a range of 1.5% by mass to 2.5% by mass.

Alternatively, the above M may be a combination of Mo in an amount selected from a range of 1.5% by mass to 6.0% by mass and Ti in an amount selected from a range of 0.5% by mass to 3.0% by mass.

Alternatively, the above M may be a combination of Mo in an amount selected from a range of 1.0% by mass to 4.5% by mass and Kb in an amount selected from a range of 2.5% by mass to 5.0% by mass.

Alternatively, the above M may be a combination of Mo in an amount selected from a range of 1.5% by mass to 4.5% by mass, Ti in an amount selected from a range of 1.0% by mass to 3.0% by mass, and W in an amount selected from a range of 0.2% by mass to 1.0% by mass.

Alternatively, the above M may be a combination of Nb in an amount selected from a range of 2.5% by mass to 3.5% by mass, W in an amount selected from a range of 1.5% by mass to 2.5% by mass, and Ti in an amount selected from a range of 0.5% by mass to 1.5% by mass.

The soft magnetic material preferably has a coercive force of 0 to 2.0 (A/m).

The soft magnetic material preferably has a maximum relative magnetic permeability of at least 100,000.

The soft magnetic component for a torque sensor according to the present invention is preferably used in a ring core for a torque sensor.

The soft magnetic component for a torque sensor according to the present invention is preferably used in a yoke for a torque sensor.

A torque sensor can be constructed of the aforementioned soft magnetic component for a torque sensor according to the present invention.

The aforementioned torque sensor is preferably used in an electric power steering (EPS).

DESCRIPTION OF THE PREFERRED EMBODIMENTS

Figure 1:
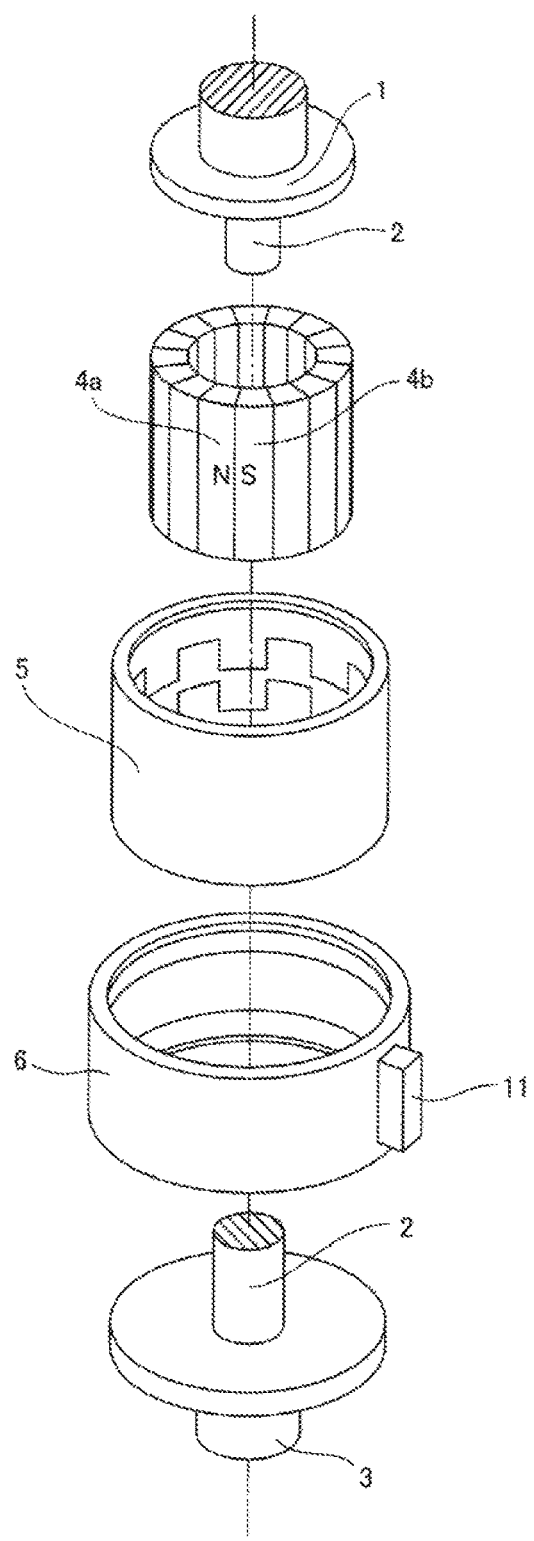
FIG. 1 is a diagram schematically showing an example of main portions of a torque sensor used in an EPS.

An important feature of the present invention is to apply, to resin molding, a soft magnetic material having a saturation magnetostriction of "at least −4.0 ppm and less than 0 ppm", which is less than zero, of soft magnetic materials having a shrinkage property when a magnetic field is applied.

In order to obtain this soft magnetic material, it is necessary to find an addition element (M) as a magnetostrictive adjustment element and make percentages of the above M, Ni, and Fe appropriate. It is simultaneously necessary to ensure predetermined various magnetic properties, such as a coercive force, a maximum relative magnetic permeability, and an initial magnetic permeability, desired for a soft magnetic component for a torque sensor and a predetermined mechanical property. Furthermore, in order for the soft magnetic material to have the predetermined various magnetic properties, magnetic annealing is required, but a magnetic annealing condition lacking practicality is required according to the type of addition element and a balance of a chemical component. In other words, even if a single element known in the prior art as an addition element of a Fe—Ni based soft magnetic material or simply combined several elements are added within an arbitrary range known in the prior art, a soft magnetic material suitable for resin molding, having the predetermined magnetic properties and the predetermined mechanical property and a saturation magnetostriction of "at least −4.0 ppm and less than 0 ppm" cannot be easily found.

In the present invention, the saturation magnetostriction of a soft magnetic material to be resin-molded is a negative value. A magnetostriction ($\lambda$) is a property in which the length of the magnetic body changes when a magnetic field is applied to a magnetic body (the soft magnetic material in the present invention), and the degree is represented by a saturation magnetostriction ($\lambda$ s) in the present invention. The magnetic body forms a micro magnet having N-S poles in an atomic size, and has a small strain, and hence upon application of the magnetic field, the directions of the N-S poles of the micro magnet in an atomic size are aligned, and a strain ($\varepsilon$) is aligned in the same direction over a crystal so that the shape is changed (strained). Generally, a mechanical strain ($\varepsilon$) is often represented by a percentage (%), but the magnetostriction ($\lambda$), which is a strain generated when the magnetic field is applied, is generally represented by parts per million [ppm], and hence this is followed.

As described above, the soft magnetic material in the present invention has a magnetostriction in a compression direction (negative direction), and hence even when the shrinkage is applied in a state where a compression stress is internally generated by resin shrinkage caused by resin molding, self-shrinkage can be performed by a self-property of shrinkage (magnetostriction in the negative direction). Thus, even when the soft magnetic material in the present invention is resin-molded, an internal compression stress is reduced by an amount corresponding to the aforementioned amount of self-shrinkage, and hence chances in the aforementioned various magnetic properties before and after resin molding can be suppressed.

The saturation magnetostriction of the soft magnetic material in the present invention is a negative value as described above, and is limited to "at least −4.0 ppm and less than 0 ppm". This is because it is necessary to have the predetermined magnetic properties applicable to the soft magnetic component for a torque sensor in the present invention, and it is not necessary to have a property of shrinking by an amount far exceeding an amount corresponding to a molding pressure due to resin molding and a compression stress generated due to resin shrinkage. For the magnetic properties, it is particularly important to have a small coercive force and a large maximum relative magnetic permeability, and the initial relative magnetic permeability is preferably large.

When the saturation magnetostriction that the soft magnetic material has exceeds "−4.0 ppm" and is large in the negative direction, i.e., it is a negative value less than "−4.0 ppm", and the absolute value exceeds 4.0 ppm, which is large, it is difficult to have a small coercive force, a large maximum relative magnetic permeability, etc. desired for a toque sensor. When the saturation magnetostriction that the soft magnetic material has is at least "0 (zero) ppm", i.e., it is zero or a positive value, the internal compression stress of the soft magnetic material resulting from the resin shrinkage at the time, of resin molding is not reduced because of the soft magnetic material having no shrinkage property in the first place and being not self-shrunk. From the standpoint of further reduction in changes in the magnetic properties, according to the result of study by the inventors, the preferable saturation magnetostriction is "a least −3.0 ppm and less than 0 ppm", and the more preferable saturation magnetostriction is "a least −2.5 ppm and less than 0 ppm".

In general resin molding for a torque sensor, a resin to be used is a thermoplastic resin (plastic) material, PBT (polybutyleneterephthalate) or PPS (polyphenylenesulfide) is used, and glass fibers may be contained. A molding pressure is determined in consideration of the type of resin, the shape and size of a compact, etc., and the molding pressures of PBT and PPS can be considered to be in the range of 30 MPa to 180 MPa.

In addition to the aforementioned PBT and PPS, a resin such as ABS (acrylonitrile-styrene copolymer), PS (polystyrene), AS (acrylonitrile-styrene), EVA (ethylene vinyl acetate), PP (polypropylene), HDPE (high density polyethylene), PMMA (methacrylic acid methyl ester), PA (polyamide), POM (polyacetal), PC (polycarbonate), or LCP (liquid, crystal polymer) is conceivably usable. The mold shrinkage percentages (a value obtained by representing a strain in a shrinkage direction by a percentage) of these resins are roughly within a range from 0.1% to 6.0%, and the mold shrinkage percentages of the aforementioned PBT and PPS can be considered to be within a range from 0.2% to 0.8%.

In the present, invention, the soft magnetic material suitable for resin molding, obtained by making the type of addition element and a balance of a chemical component appropriate contains Ni (nickel), Fe (iron) in such an amount that Fe/(Fe+Ni) is within a range from 10.0% to 16.0% in terms of mass ratio, and 3.5% by mass to 7.5% by mass of M (the above M represents one or more elements selected from among Mo (molybdenum), Nb (niobium), Cr (chromium), Cu (copper), Ti (titanium), and W (tungsten)). The content of an element is hereinafter represented by mass % unless otherwise noted.

(Ni, Fe)

In the soft magnetic material for a torque sensor, Ni and Fe are necessary elements for obtaining the predetermined magnetic properties and the predetermined mechanical property applicable to the soft magnetic component for a torque sensor according to the present invention, and are elements that generate a basis material for the soft magnetic material. The basic magnetic properties of the soft magnetic material, such as a coercive force, a maximum relative magnetic permeability, an initial relative magnetic permeability, an effective relative magnetic permeability, and a maximum magnetic flux density as well as a magnetostriction, are roughly determined by a content ratio of Ni and Fe. In the present invention, with respect to Ni, Fe is controlled such that Fe/(Fe+Ni) is within the range from 10.0% to 16.0% in terms of mass ratio, whereby the various magnetic properties (particularly a coercive force and a maximum relative magnetic permeability) of the soft magnetic material are stabilized. For example, Fe is selectively contained from a range from roughly 8.3% by mass to 16.2% by mass such that Ni is within a range from 75.0% by mass to 85.0% by mass with respect to the entire mass of the soft magnetic material and Fe/(Fe+Ni) is within the range from 10.0% to 16.0% according to the above formula, whereby the basic magnetic properties of the soft magnetic material desired for a torque sensor can be obtained. (3.5% to 7.5% of M)

In the present invention, it is important to further add 3.5% by mass to 7.5% by mass of M (the above M represents one or more elements selected from among Mo, Nb, Cr, Cu, Ti, and W) to Ni and Fe by which the aforementioned basic magnetic properties of the soft magnetic material are obtained. The magnetic properties and the mechanical property desired for a torque sensor can be adjusted in the range of a practical magnetic annealing condition by containing the above M. In other words, at least one element represented by the above M influences stabilization of the magnetic annealing condition and the magnetic properties necessary for the soft magnetic material. The soft magnetic material that has obtained the practical magnetic annealing by containing the above M can have the aforementioned basic magnetic properties and a saturation magnetostriction of "at least −4.0 ppm and less than 0 ppm", which is smaller than zero, and hence a soft magnetic material suitable for the soft magnetic component for a torque sensor is obtained.

When the above M is less than 3.5%, the saturation magnetostriction may not be a negative value, or the cooling rate of the magnetic annealing to obtain the suitable magnetic properties may be increased so that this makes it difficult to achieve the practical use. When the above M exceeds 7.5%, the content ratio of Ni and Fe is relatively reduced, and hence the basic magnetic properties necessary for a torque sensor may not be obtained. Particularly, the maximum magnetic flux density may be reduced. The above M is preferably 3.8% by mass to 6.5% by mass, and the magnetic properties such as the maximum magnetic flux density as veil as the coercive force and the maximum relative magnetic permeability can be made suitable. An element or a combination of elements to be contained in the above M other than the aforementioned elements is conceivable, but the above M is preferable since element adjustment, handling, etc. of the above M are easy in practice.

There are several options, such as only Mo, only Nb, only Cr, two of Mo and Cu, two of Mo and Ti, two of Mo and Nb, three of Mo, Ti, and W, and three of Nb, W, and Ti, as the above M, but a difference occurs in an influence on the magnetostriction of the soft magnetic material and other magnetic properties by the option of the element(s).

(M: Only Mo)

When only Mo is selected as the above M, for example, it may be 3.5% by mass to 6.5% by mass. Mo has an effect of making the aforementioned basic magnetic properties of the soft magnetic material obtained by Si and Fe more desirable for a torque sensor, and an effect of widening the effective range of the predetermined cooling rate of the magnetic annealing necessary for that. When Mo exceeds 6.5%, an influence on the magnetic properties is increased, and hence it is necessary to pay attention to handling by more strictly controlling variations of the content, etc. When Mo is less than 3.5%, the saturation magnetostriction may be a positive value, an effect of improving another magnetic property is reduced, and an effect on the cooling rate becomes insufficient.

(M: Only Nb)

When only Nb is selected as the above M, for example, it may be 5.0% by mass to 6.5% by mass. Nb has an effect of improving the mechanical strength of the soft magnetic material in addition to an effect of making the aforementioned basic magnetic properties of the soft magnetic material obtained by Ni and Fe more desirable for a torque sensor. When Nb exceeds 6.5%, an influence on the magnetic properties is increased, and hence it is necessary to pay attention to handling by more strictly controlling variations of the content, etc. When Nb is less than 5.0%, effects of improving the magnetic properties and the mechanical strength tend to be reduced.

(M: Only Cr)

When only Cr is selected as the above M, for example, it may be 3.5% by mass to 6.0% by mass. Cr can improve the corrosion resistance of the soft magnetic material, but tends to slow the rise of the magnetic flux density so that Cr may have a bad influence on the magnetic properties such as a magnetic permeability. When Cr exceeds 6.0%, an influence on the magnetic properties is increased, and hence it is necessary to pay attention to handling by more strictly controlling variations of the content, etc. When Cr is less than 3.5%, not only an effect of improving the corrosion resistance becomes insufficient, but also the saturation magnetostriction may be a positive value.

(M: Two of Mo and Cu)

When two of Mo and Cu are selected as the above M, for example, 3.5% by mass to 5.0% by mass of Mo and 1.5% by mass to 2.5% by mass of Cu may be combined within a range from 3.5% by mass to 7.5% by mass of the above M. Cu has a diamagnetic property to be magnetized in the opposite direction of a magnetic field by application of the magnetic field, and hence with respect to 3.5% to 5.0% of Mo, at least 1.5% of Cu is contained so that an effect of reducing the coercive force of the soft magnetic material can foe promised. When (Mo+Cu) exceeds 7.5%, however, the magnetic properties for a torque sensor become insufficient.

(M: Two of Mo and Ti)

When two of Mo and Ti are selected as the above M, for example, 1.5% by mass to 6.0% by mass of Mo and 0.5% by mass to 3.0% by mass of Ti may be combined within the range from 3.5% by mass to 7.5% by mass of the above M. A combination of Mo and Ti has an effect of making the aforementioned basic magnetic properties of the soft magnetic material obtained by Ni and Fe more desirable for a torque sensor, Mo has an effect of widening the effective range of the predetermined cooling rate of the magnetic annealing, as described above. Ti has an effect of improving the mechanical strength of the soft magnetic material, etc. When (Mo+Ti) exceeds 7.5% or is less than 3.5%, however, the magnetic properties suitable for a torque sensor may not be obtained.

(M: Two of Mo and Nb)

When two of Mo and Nb are selected as the above M, for example, 1.0% by mass to 4.5% by mass of Mo and 2.5% by mass to 5.0% by mass of Nb may be combined within the range from 3.5% by mass to 7.5% by mass of the above M, A combination of Mo and Nb has an effect of making the aforementioned basic magnetic properties of the soft magnetic material obtained by Ni and Fe more desirable for a torque sensor. Mo has an effect of widening the effective range of the predetermined cooling rate of the magnetic annealing, as described above. Nb has an effect of improving the mechanical strength of the soft magnetic material, as described above. When (Mo+Nb) exceeds 7.5%, however, the magnetic properties suitable for a torque sensor may not be obtained, and when (Mo+Nb) is less than 3.5%, an effect of improving the magnetic properties and the mechanical strength for a torque sensor may not be obtained.

(M: Three of Mo, Ti, and W)

When three of Mo, Ti, and W are selected as the above M, for example, 1.5% by mass to 4.5% by mass of Mo, 1.0% by mass to 3.0% by mass of Ti, and 0.2% by mass to 1.0% by mass of W may be combined within the range from 3.5% by mass to 7.5% by mass of the above M. A combination of Mo, Ti, and W has an effect of improving the mechanical strength of the soft, magnetic material in addition to an effect of making the aforementioned basic magnetic properties of the soft magnetic material obtained by Ni and Fe more desirable for a torque sensor. When (Mo+Ti+W) exceeds 7.5%, however, the magnetic properties suitable for a torque sensor may not be obtained, and when (Mo+Ti+W) is less than 3.5%, an effect, of improving the magnetic properties and the mechanical strength for a torque sensor may not be obtained.

(M: Three of Nb, W, and Ti)

When three of Nb, W, and Ti are selected as the above M, for example, 2.5% by mass to 3.5% by mass of Nb, 1.5% by mass to 2.5% by mass of W, and 0.5% by mass to 1.5% by mass of Ti may be combined within the range from 3.5% by mass to 7.5% by mass of the above M. A combination of Nb, W, and Ti has an effect of improving the mechanical strength of the soft magnetic material in addition to an effect of making the aforementioned basic magnetic properties of the soft magnetic material obtained by Ni and Fe more desirable for a torque sensor. When (Nb+W+Ti) exceeds 7.5%, however, the magnetic properties suitable for a torque sensor may not be obtained, and when (Nb+W+Ti) is less than 3.5%, the saturation magnetostriction may be a positive value.

The soft magnetic material in the present invention may contain an element such as Si (silicon), Mn (manganese), Mg (magnesium), B (boron), Al (aluminum), C (carbon), S (sulfur), P (phosphorus), O (oxygen), or N (nitrogen) in addition to Ni, Fe, and the above M.

In manufacturing the soft magnetic material in the present invention, Si, Mn, and Al can be used as a deoxidizing agent, and Mn can be used as a desulfurizing agent. Si, Mn, and Mg contribute to improvement of hot workability, and B contributes to improvement of hot and warm forgibility and reliability. However, Si tends to slow the rise of the magnetic flux density and may have an unfavorable influence on the magnetic properties of the soft magnetic material, and hence Si is preferably not more than 2.0 mass %, more preferably not more than 1.0 mass %, still more preferably not more than 0.7 mass %, and may not be contained at all. Mn may not be contained at all, but Mn tends to hasten the rise of the magnetic flux density inversely to Si and may have a favorable influence on the magnetic properties of the soft magnetic material. Thus, at least 0.2 mass % of Mn may be contained. Although Mn produces the aforementioned function effect, too much Mn may have an unfavorable influence on the magnetic properties, and hence Mn is preferably reduced to not more than 0.7 mass %. Furthermore, too much Al and Mg may have an unfavorable influence on the magnetic properties, and hence Al and Mg are preferably not more than 0.05 mass %, more preferably not more than 0.02 mass %, and may not be contained at all. Similarly to Al etc., B is preferably not more than 0.01 mass %, more preferably not more than 0.005 mass %, and may not be contained at all. The other C, S, P, O, and N are reduced to as little as possible, and are preferably reduced to not more than 0.01 mass %, for example.

The preferable ranges of a coercive force and a maximum relative magnetic permeability on which the inventors have focused attention next to the aforementioned magnetostriction of the magnetic properties desired for the soft magnetic material formed into the soft magnetic component for a torque sensor are now described.

(Coercive Force)

A coercive force influences the sensitivity, responsiveness, and hysteresis of a torque sensor, in detection of a torque, an output (voltage value) to an input (torque value), i.e. the sensitivity (V/kgf·m), is desired to be larger, and the hysteresis is desired to be smaller (an area in a hysteresis curve is desired to be smaller). Thus, the coercive force of the soft magnetic material before resin molding in the present invention is preferably not more than 2.0 (A/m), more preferably not more than 1.6 (A/m), still more preferably not more than 1.3 (A/m), and ideally zero. In this order, the hysteresis can be reduced.

(Maximum Relative Magnetic Permeability)

A maximum relative magnetic permeability influences the responsiveness and resolution of a torque sensor. In detection of a torque, a high resolution is desired in order to reduce a targeted control amount (torque value). Generally, when a maximum relative magnetic permeability is large, the resolution is easily increased, and hence the maximum relative magnetic permeability of the soft magnetic material before resin molding is preferably at least 100,000 in the present invention.

Furthermore, the following magnetic properties are preferably in the range of a predetermined value.

(Initial Relative Magnetic Permeability)

An initial relative magnetic permeability influences the responsiveness and resolution of a torque sensor, similarly to the maximum relative magnetic permeability. Thus, a value of the initial relative magnetic permeability is preferably as high as possible. Particularly, the initial relative magnetic permeability (μ0.4) of the soft magnetic material before resin molding is preferably at least 30,000, which is effective for improving the responsiveness and resolution of a torque sensor. Here, the initial relative magnetic permeability (μ0.4) denotes a relative magnetic permeability in a magnetic field 0.4 (A/m) based on the JIS standards (JIS-C2531).

(Effective Relative Magnetic Permeability)

An effective relative magnetic permeability influences the sensitivity, responsiveness, and hysteresis of a torque sensor, similarly to the coercive force. Thus, a value of the effective relative magnetic permeability is preferably as high as possible. The effective relative magnetic permeability is influenced by an applied frequency and a sheet thickness obtained when the soft magnetic material is formed into the soft magnetic component in addition to the magnetic properties. In other words, a preferred value for the effective relative magnetic permeability is changed according to various conditions when used for a torque sensor, and hence it is difficult to univocally define the preferred value. Generally, as a coercive force is reduced and/or a magnetic permeability is increased, an effective relative magnetic permeability tends to be increased. As an applied frequency is increased, an influence of the thickness of the soft magnetic component is increased, and hence the reduced thickness of the soft magnetic component is more advantageous when a high frequency is applied.

(Maximum Magnetic Flux Density)

Figure 2:
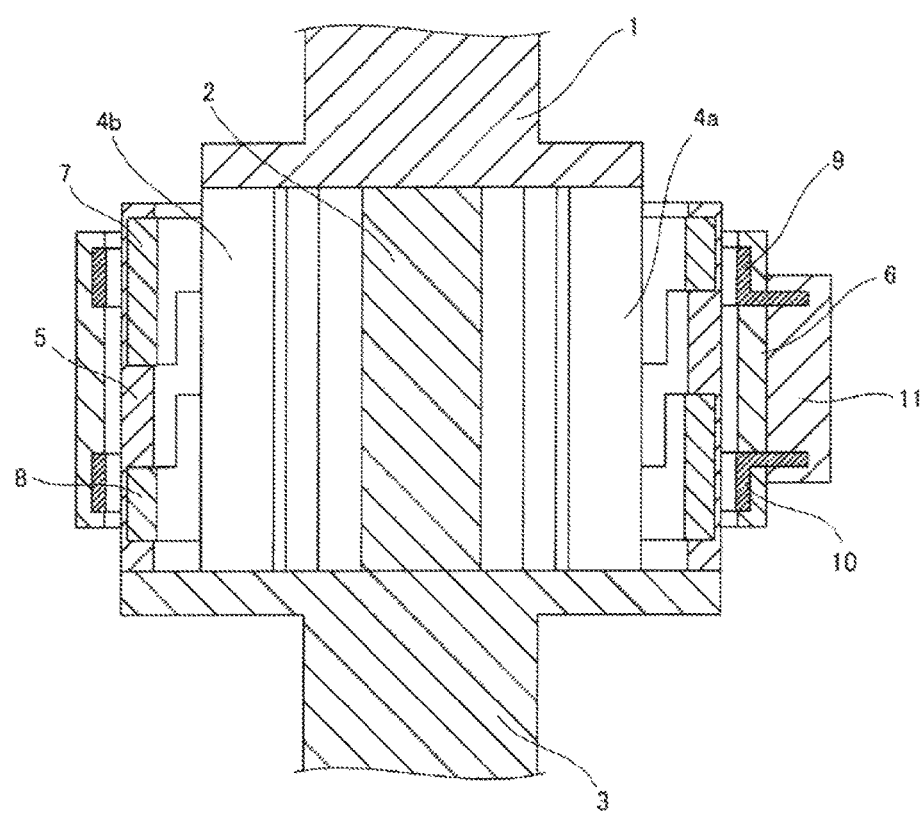
FIG. 2 is a diagram schematically showing a section of the torque sensor shown in FIG. 1.

A maximum magnetic flux density is associated with reductions in the size and weight of the soft magnetic component for a torque sensor, and influences the shape sizes (particularly the volumes) of a ring core and a yoke, for example. In a soft magnetic component for a torque sensor using a soft magnetic material having a high maximum magnetic flux density, the amount of magnetic flux capable of penetrating per volume is large, and hence magnetic flux generated in a magnetic circuit of a torque sensor is allowed to penetrate with a small volume, and the volume of the soft magnetic component for a torque sensor can be reduced. In the present invention, the maximum magnetic flux density of the soft magnetic material before resin molding is preferably at least 0.6 (T), which can contribute to reductions in the size and weight of the soft, magnetic component for a torque sensor and can also contribute to reductions in the size and weight of a torque sensor using the same A torque sensor according to the present invention constructed of the soft magnetic component for a torque sensor according to the present invention is now concretely described properly using the drawings with a configuration example of a torque sensor used in an electric power steering (EPS) or the like. FIG. 1 schematically shows main portions of a typical torque sensor. FIG. 2 schematically shows a section of the main portions of the torque sensor shown in FIG. 1, taken along an axial direction.

This torque sensor includes an input shaft 1 coupled to a steering wheel (not shown), an output shaft 3 coupled to a steering mechanism (not shown), a torsion bar 2 coupling these two shafts, north poles 4a and south poles 4b of magnets provided around this torsion bar 2, a resin structure 5 provided around these magnets, and a resin structure 6 provided around the resin structure 5.

Figure 3:
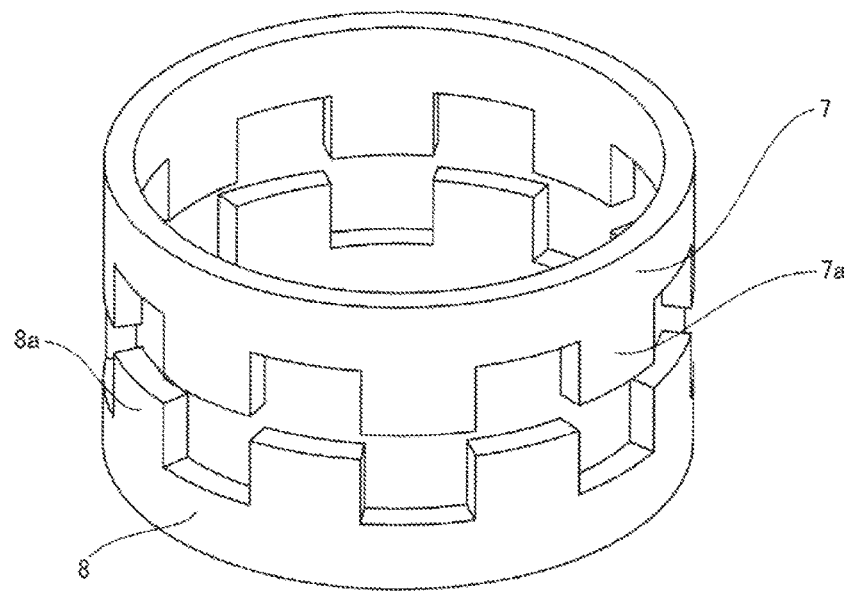
FIG. 3 is a diagram schematically showing a yoke before resin molding used in the torque sensor shown in FIG. 1.

The resin structure 5 is a resin-molded soft magnetic component including an upper yoke 7 and a lower yoke 8 (sometimes hereinafter collectively referred to as the "upper and lower yokes 7 and 8"). The upper and lower yokes 7 and 8 have substantially the same shape, as shown in FIG. 3, and multiple protrusions 7a and 8a fit together to alternately face each other.

Figure 4:
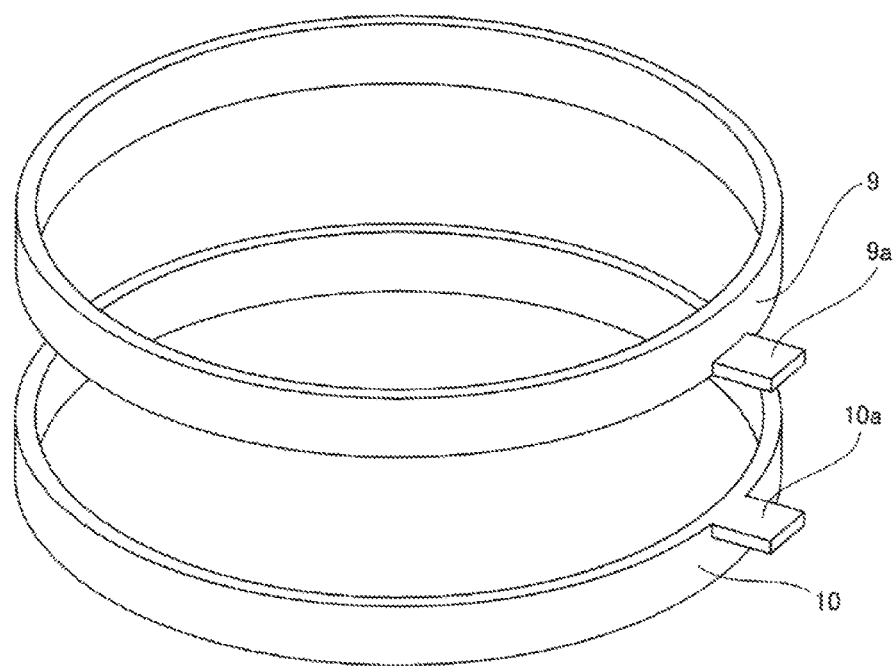
FIG. 4 is a diagram schematically showing a ring core before resin molding used in the torque sensor shown in FIG. 1.

The resin structure 6 is a resin-molded soft magnetic component including an upper ring core 9, a lower ring core 10 (sometimes hereinafter collectively referred to as the "upper and lower ring cores 9 and 10"), and a detection portion 11 including a Hall element or the like that detects magnetic flux. The upper and lower ring cores 9 and 10 are also called a magnetic collecting ring, and have substantially the same shape, as shown in FIG. 4. The detection portion 11 is provided in one location on the outer circumferences of the upper and lower ring cores 9 and 10 to protrude, and is arranged between a protrusion 9a of the upper ring core 9 and a protrusion 10a of a lower ring core 10.

In the torque sensor shown in FIG. 1, the upper and lower yokes 7 and 8 and the upper and lower ring cores S and 10 are arranged in a magnetic field generated by the north poles 4a and the south poles 4b of the magnets provided around the torsion bar 2, and a type of magnetic circuit id formed. When a steering force is applied to the steering wheel, the input shaft 1 is rotated by the rotation of the steering wheel, and the torsion bar 2 is rotated (or twisted) by the rotation of the input shaft 1. When the north poles 4a and the south poles 4b of the magnets are moved by the rotation (or torsion) of the torsion bar 2, the positional relationship of the protrusions 7a and 8a and the upper and lower yokes 7 and 8 with respect to the magnets is varied (or angular differences are generated).

In the magnetic field, although magnetic flux lines penetrate through the protrusions 7a of the upper yoke 7 and the protrusions 8a of the lower yoke 8, the penetrating magnetic flux lines are changed according to the aforementioned variation in the positional relationship of the upper and lower yokes 7 and S with respect to the magnets (or the angular differences), and the magnetic flux is varied according to the changes in the magnetic flux lines. This variation in the magnetic flux appears relatively prominently in the multiple protrusions 7a and 8a of the upper and lower yokes 7 and 8, is caught and emphasized by the upper and lower ring cores 9 and 10, and is eventually converted into a potential difference by the Hall element of the detection portion 11. In this manner, a steering torque according to the steering force can be measured, by the detection portion 11 of the torque sensor, as the amount of voltage or current change proportional to the rotation (or the torsion) of the torsion bar 2.

The amount of change in the magnetic flux lines (magnetic flux) induced by the aforementioned variation in the positional relationship of the upper and lower yokes 7 and 8 with respect to the magnets correlates with the amount of rotation (or the torsional angle) of the torsion bar 2, and hence the amount of rotation (or the torsional angle) of the torsion bar 2 can be measured by detecting this amount of change in the magnetic flux. More specifically, the amount of rotation (or the torsional angle) of the steering wheel connected to the torsion bar 2 through the input shaft 1 can be measured.

In this torque sensor, it is important to have a predetermined resolution and have high responsiveness to an input, high reproducibility, and high sensitivity. Thus, quickness of the rise (magnetizing) and the fall (demagnetizing) of the changes in the magnetic flux lines, a low hysteresis property, and a large number of the magnetic flux lines allowed to penetrate become important. Therefore, as the magnetic properties desired for the upper and lower yokes 7 and 8 and the upper and lower ring cores 9 and 10, which are soft magnetic components, a large initial relative magnetic permeability, a large maximum relative magnetic permeability, a small coercive force, and a large maximum magnetic flux density become important. Particularly, the coercive force having a significant influence on the low hysteresis property should be considered to be important.

Even when a soft magnetic material, having suitable magnetic properties is selected, in the soft magnetic material, the magnetic properties of which are significantly changed before and after resin molding, a range of variation in the magnetic properties may foe increased, and hence practically, it is not preferable to use it for the soft magnetic component for a torque sensor. In this regard, the soft magnetic material in the present invention has a saturation magnetostriction of at least −4.0 ppm and less than 0 ppm so that changes in the magnetic properties before and after resin molding can be suppressed. Thus, it is effective to use it for the soft magnetic component for a torque sensor.

EXAMPLES

The yokes and ring cores according to an embodiment of the soft magnetic component for a torque sensor in the present invention applicable to the aforementioned torque sensor for the EPS were manufactured by the following method.

First, on soft magnetic materials according to Examples 1 to 19 and Comparative Examples 1 to 4 having chemical components shown in Table 1, hot forging, hot working, and cold working such as cold working were performed using ingots each obtained by pelting and casting a proper raw material so that multiple flat plates having a thickness shown in Table 2 were prepared with respect to each material. Then, the prepared flat plates were formed into perforated flat plates (an outer diameter of 10 mm and an inner diameter of 6 mm) by press punching, and magnetic annealing was performed on the respective perforated flat plates under heat treatment conditions shown in Table 2.

TABLE 1

| SIGN | Ni MASS % | Fe MASS % | Fe/(Fe + Ni) % | Mo MASS % | Nb MASS % | Cr MASS % | Cu MASS % | Ti MASS % |
|---|---|---|---|---|---|---|---|---|
| EXAMPLE 1 | 81.1 | 12.7 | 13.6 | 5.54 | <0.01 | <0.01 | <0.01 | <0.01 |
| EXAMPLE 2 | 81.2 | 12.8 | 13.6 | 5.46 | <0.01 | <0.01 | <0.01 | <0.01 |
| EXAMPLE 3 | 80.9 | 12.3 | 13.2 | 6.03 | <0.01 | <0.01 | 0.01 | <0.01 |
| EXAMPLE 4 | 82.0 | 13.8 | 14.4 | <0.01 | <0.01 | 3.80 | <0.01 | <0.01 |
| EXAMPLE 5 | 81.0 | 14.7 | 18.3 | <0.01 | <0.01 | 3.84 | <0.01 | <0.01 |
| EXAMPLE 6 | 80.9 | 12.3 | 13.2 | <0.01 | 6.34 | <0.01 | <0.01 | <0.01 |
| EXAMPLE 7 | 81.2 | 12.8 | 13.6 | <0.01 | 2.87 | <0.01 | <0.01 | 0.69 |
| EXAMPLE 8 | 80.6 | 13.0 | 12.9 | 1.45 | 4.29 | 0.01 | <0.01 | <0.01 |
| EXAMPLE 9 | 82.1 | 13.6 | 14.2 | 2.14 | <0.01 | <0.01 | <0.01 | 1.47 |
| EXAMPLE 10 | 81.9 | 11.4 | 12.2 | 3.53 | <0.01 | <0.01 | <0.01 | 2.50 |
| EXAMPLE 11 | 81.5 | 11.7 | 12.6 | 4.00 | <0.01 | <0.01 | <0.01 | 2.00 |
| EXAMPLE 12 | 81.5 | 11.7 | 12.6 | 4.00 | <0.01 | <0.01 | <0.01 | 2.50 |
| EXAMPLE 13 | 81.5 | 12.2 | 12.0 | 4.00 | <0.01 | <0.01 | <0.01 | 2.00 |
| EXAMPLE 14 | 81.5 | 13.2 | 13.9 | 4.00 | <0.01 | <0.01 | <0.01 | 1.00 |
| EXAMPLE 15 | 82.5 | 10.7 | 11.5 | 4.00 | <0.01 | <0.01 | <0.01 | 2.00 |
| EXAMPLE 16 | 81.6 | 14.4 | 15.0 | 3.93 | <0.01 | <0.01 | <0.01 | <0.01 |
| EXAMPLE 17 | 81.8 | 12.7 | 13.4 | <0.01 | <0.01 | 9.04 | <0.01 | <0.01 |
| EXAMPLE 18 | 81.5 | 14.2 | 14.8 | 2.00 | <0.01 | <0.01 | <0.01 | 2.00 |
| EXAMPLE 19 | 80.6 | 12.0 | 13.0 | 3.29 | 3.63 | <0.01 | <0.01 | <0.01 |
| COMPARATIVE EXAMPLE 1 | 77.5 | 13.6 | 14.9 | 4.54 | <0.01 | <0.01 | 3.52 | <0.01 |
| COMPARATIVE EXAMPLE 2 | 80.0 | 15.7 | 10.4 | <0.01 | <0.01 | 3.85 | <0.01 | <0.01 |
| COMPARATIVE EXAMPLE 3 | 80.0 | 16.5 | 17.1 | <0.01 | 3.00 | <0.01 | <0.01 | <0.01 |
| COMPARATIVE EXAMPLE 4 | 86.5 | 9.2 | 9.6 | <0.01 | <0.01 | 3.84 | <0.01 | <0.01 |

TABLE 1-continued

| SIGN | W MASS % | M MASS % | M ELEMENT | Mn MASS % | Si MASS % | C MASS % | S MASS % |
|---|---|---|---|---|---|---|---|
| EXAMPLE 1 | <0.01 | 5.54 | Mo | 0.55 | 0.04 | 0.002 | <0.001 |
| EXAMPLE 2 | <0.01 | 5.46 | Mo | 0.50 | 0.03 | 0.005 | <0.001 |
| EXAMPLE 3 | <0.01 | 6.04 | Mo, Cu | 0.51 | 0.14 | 0.009 | 0.001 |
| EXAMPLE 4 | <0.01 | 3.80 | Cr | 0.46 | <0.01 | <0.001 | <0.001 |
| EXAMPLE 5 | <0.01 | 3.54 | Cr | 0.46 | <0.01 | <0.001 | <0.001 |
| EXAMPLE 6 | <0.01 | 6.34 | Nb | 0.30 | 0.22 | <0.001 | <0.001 |
| EXAMPLE 7 | 1.74 | 5.80 | Nb, Ti, W | 0.51 | <0.01 | <0.001 | <0.001 |
| EXAMPLE 8 | <0.01 | 5.75 | Mo, Nb, Cr | 0.55 | 0.16 | 0.002 | 0.001 |
| EXAMPLE 9 | 0.47 | 4.08 | Mo, Ti, W | 0.30 | <0.01 | <0.001 | <0.001 |
| EXAMPLE 10 | 0.32 | 5.49 | Mo, Ti, W | 0.29 | <0.01 | <0.001 | <0.001 |
| EXAMPLE 11 | 0.50 | 6.50 | Mo, Ti, W | 0.30 | <0.01 | <0.001 | <0.001 |
| EXAMPLE 12 | <0.01 | 6.80 | Mo, Ti | 0.30 | <0.01 | <0.001 | <0.001 |
| EXAMPLE 13 | <0.01 | 6.00 | Mo, Ti | 0.30 | <0.01 | <0.001 | <0.001 |
| EXAMPLE 14 | <0.01 | 5.00 | Mo, Ti | 0.30 | <0.01 | <0.001 | <0.001 |
| EXAMPLE 15 | 0.50 | 6.50 | Mo, Ti | 0.30 | <0.01 | <0.001 | <0.001 |
| EXAMPLE 16 | <0.01 | 3.83 | Mo | 0.59 | <0.01 | <0.001 | <0.001 |
| EXAMPLE 17 | <0.01 | 5.04 | Cr | 0.48 | 0.015 | 0.001 | <0.001 |
| EXAMPLE 18 | <0.01 | 4.00 | Mo, Ti | 0.30 | <0.01 | <0.001 | <0.001 |
| EXAMPLE 19 | <0.01 | 5.92 | Mo, Nb | 0.48 | 0.10 | 0.005 | <0.001 |
| COMPARATIVE EXAMPLE 1 | <0.01 | 8.06 | Mo, Cu | 0.87 | 0.01 | 0.01 | <0.001 |
| COMPARATIVE EXAMPLE 2 | <0.01 | 3.85 | Cr | 0.45 | <0.01 | <0.001 | <0.001 |
| COMPARATIVE EXAMPLE 3 | <0.01 | 3.00 | Nb | 0.50 | <0.01 | <0.001 | <0.001 |
| COMPARATIVE EXAMPLE 4 | <0.01 | 3.84 | Cr | 0.46 | <0.01 | <0.001 | <0.001 |

(ANNOTATION) "M": TOTAL CONTENT OF Mo, Ni, Nb, Cr, Cu, Ti, AND W (ROUNDED TO THE NEAREST 0.01).
"<0.01": MEASUREMENT VALUE LESS THAN 0.01,
"<0.001": MEASUREMENT VALUE LESS THAN 0.001

TABLE 2

| SIGN | THICKNESS OF FLAT PLATE mm | MAGNETIC ANNEALING CONDITIONS | | |
|---|---|---|---|---|
| | | HOLDING TEMPERATURE ° C. | HOLDING TIME h | COOLING RATE ° C./h |
| EXAMPLE 1 | 0.55 | 1100 | 3 | 100 |
| EXAMPLE 2 | 0.32 | 1100 | 3 | 100 |
| EXAMPLE 3 | 0.32 | 1100 | 3 | 100 |
| EXAMPLE 4 | 0.65 | 1100 | 3 | 100 |
| EXAMPLE 5 | 0.65 | 1100 | 3 | 100 |
| EXAMPLE 6 | 0.50 | 1100 | 3 | 100 |
| EXAMPLE 7 | 0.10 | 1150 | 3 | 600 |
| EXAMPLE 8 | 0.55 | 1100 | 3 | 100 |
| EXAMPLE 9 | 0.10 | 1100 | 3 | 600 |
| EXAMPLE 10 | 0.10 | 1100 | 3 | 600 |
| EXAMPLE 11 | 0.10 | 1100 | 3 | 600 |
| EXAMPLE 12 | 0.10 | 1100 | 3 | 600 |
| EXAMPLE 13 | 0.10 | 1100 | 3 | 600 |
| EXAMPLE 14 | 0.10 | 1100 | 3 | 600 |
| EXAMPLE 15 | 0.10 | 1100 | 3 | 600 |
| EXAMPLE 16 | 0.10 | 1100 | 3 | 600 |
| EXAMPLE 17 | 0.65 | 1100 | 3 | 600 |
| EXAMPLE 18 | 0.10 | 1100 | 3 | 600 |
| EXAMPLE 19 | 0.10 | 1100 | 3 | 600 |
| COMPARATIVE EXAMPLE 1 | 0.20 | 1100 | 3 | 100 |
| COMPARATIVE EXAMPLE 2 | 0.65 | 1100 | 3 | 100 |
| COMPARATIVE EXAMPLE 3 | 0.65 | 1100 | 3 | 600 |
| COMPARATIVE EXAMPLE 4 | 0.65 | 1100 | 3 | 100 |

Then, after the magnetic annealing, the multiple perforated flat plates were stacked in close contact with each other so that the thickness becomes about 2.0 mm, whereby a test specimen corresponding to each of Examples 2 to 19 and Comparative Examples 1 to 4 was prepared. The respective test specimens are described below as "Example 1" to "Example 19" and "Comparative Example 1" to "Comparative Example 4" for convenience. When generally described, test specimens corresponding to Examples 1 to 19 are described as a "test specimen $\underline{A}$", and test specimens corresponding to Comparative Examples 1 to 4 are described as a "test specimen B".

Resin-molded test specimens $\underline{A}$ and B including the test specimens $\underline{A}$ and B prepared as described above were prepared by resin molding. Specifically, they were prepared by coating and molding (resin-molding) one test specimen in a predetermined shape using a composition for molding containing a main agent (PE-10 manufactured by AICA Kogyo Co., Ltd.) and a hardener (XNH2503 manufactured by Nagase ChemteX Corporation), defoaming the same under a vacuum atmosphere (by vacuuming), and performing heat hardening treatment on the same (holding the same at an atmospheric temperature of 85° C. for 2 hours).

Then, the various magnetic properties of the prepared test specimens and the resin-molded test specimens as objects to be measured were measured. Specifically, the saturation magnetostriction ($\lambda$s), the initial relative magnetic permeability ($\mu$0.4), the maximum relative magnetic permeability ($\mu$m), the maximum magnetic flux density (B800), the residual flux density (Br), the coercive force (Hc), and the effective relative magnetic permeability ($\mu$e) were measured. The saturation magnetostriction was measured by a strain gauge method. The initial relative magnetic permeability ($\mu$0.4), the maximum relative magnetic permeability ($\mu$m), the maximum magnetic flux density (B800), the residual flux density (Br), and the coercive force (Hc) were measured with a B-H tracer. As to the effective relative magnetic permeability, a value at H=0.8 A/m was measured by a transformer method.

Figure 5:
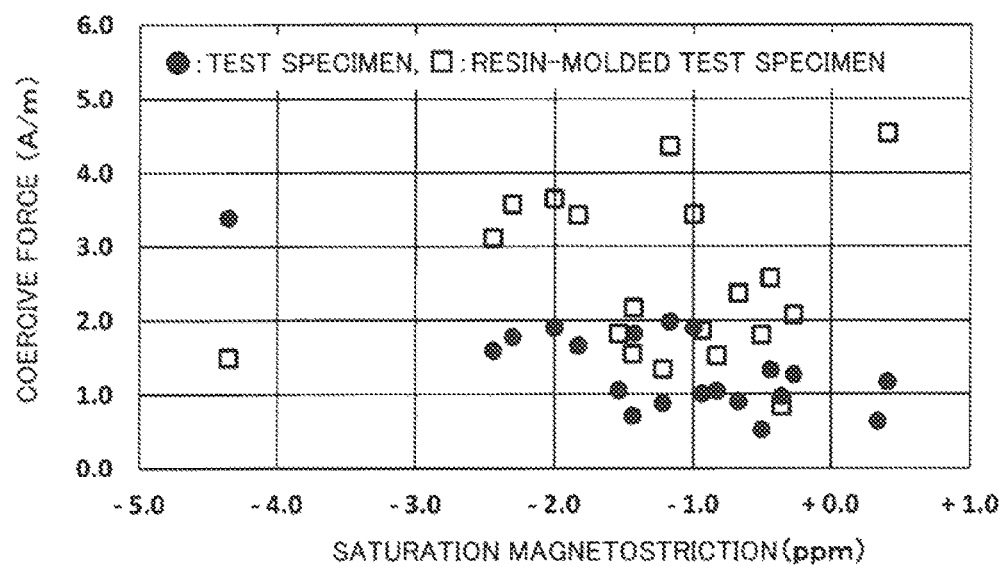
FIG. 5 is a diagram (graph) for comparing changes in a coercive force before and after resin molding with respect to a saturation magnetostriction.
Figure 6:
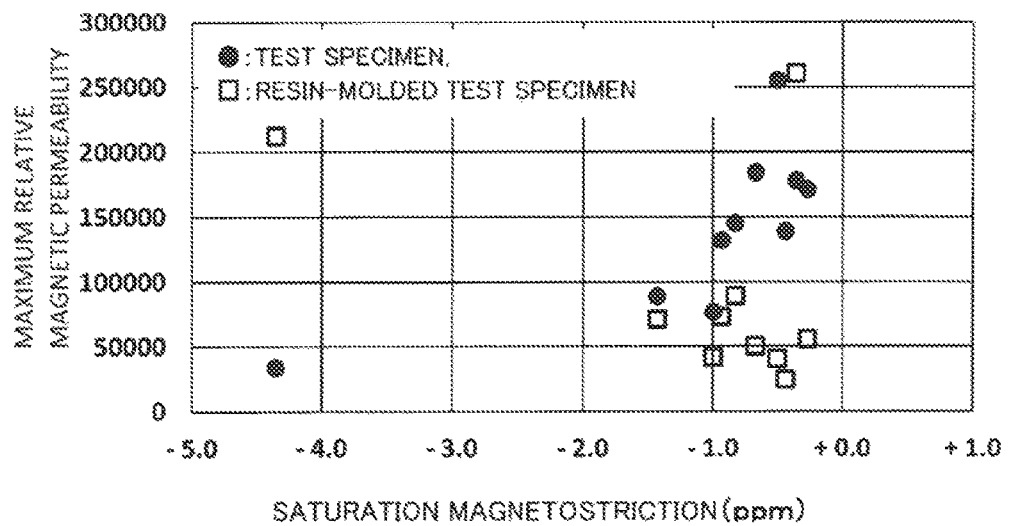
FIG. 6 is a diagram (graph) for comparing changes in a maximum relative magnetic permeability before and after resin molding with respect to a saturation magnetostriction.

Measurement results for the test specimens before resin molding are shown in Table 3, and measurement results for the resin-molded test specimens are shown in Table 4. Change rates of the coercive forces (Hc) before and after resin molding extracted from Table 3 and Table 4 are shown in Table 5, and change rates of the maximum relative magnetic permeability ($\mu m$) before and after resin molding extracted from Table 3 and Table 4 are shown in Table 6. A graph for comparing changes in the coercive forces (Hc) before and after resin molding with respect to the saturation magnetostrictions is shown in FIG. 5, and a graph for comparing changes in the maximum relative magnetic permeabilities ($\mu m$) before and after resin molding with respect to the saturation magnetostrictions is shown in FIG. 6.

TABLE 3

| SIGN | SATURATION MAGNETO-STRICTION ($\lambda o$) ppm | INITIAL RELATIVE MAGNETIC PERMEABILITY ($\mu 0.4$) | MAXIMUM RELATIVE MAGNETIC PERMEABILITY ($\mu\infty$) | MAXIMUM MAGNETIC FLUX DENSITY ($\mu m$) T | RESIDUAL MAGNETIC FLUX DENSITY (B800) T | COERCIVE FORCE (Hz) A/m | EFFECTIVE RELATIVE MAGNETIC PERMEABILITY ($\mu o$) | | | |
|---|---|---|---|---|---|---|---|---|---|---|
| | | | | | | | 0.5 kHz | 1 kHz | 10 kHz | 100 kHz |
| EXAMPLE 1 | −0.83 | 52,000 | 145,000 | 0.730 | 0.303 | 1.04 | 15,100 | 7,270 | 1,760 | 430 |
| EXAMPLE 2 | −0.93 | 58,000 | 152,000 | 0.732 | 0.273 | 1.01 | 25,600 | 12,000 | 2,770 | 670 |
| EXAMPLE 3 | −0.50 | 186,000 | 255,000 | 0.691 | 0.258 | 0.53 | 27,800 | 12,900 | 3,110 | 760 |
| EXAMPLE 4 | −1.43 | 24,000 | 88,800 | 0.737 | 0.327 | 1.82 | 10,300 | 5,290 | 1,370 | 329 |
| EXAMPLE 5 | −0.44 | 49,000 | 139,000 | 0.762 | 0.361 | 1.33 | 13,200 | 6,600 | 1,560 | 360 |
| EXAMPLE 6 | −0.36 | 54,000 | 178,000 | 0.671 | 0.384 | 0.97 | 15,300 | 7,080 | 1,500 | 350 |
| EXAMPLE 7 | −1.00 | 30,000 | 76,800 | 0.772 | 0.345 | 1.90 | 28,900 | 21,700 | 6,550 | 1,430 |
| EXAMPLE 8 | −0.27 | 38,000 | 171,000 | 0.707 | 0.468 | 1.27 | 13,800 | 6,310 | 1,340 | 320 |
| EXAMPLE 9 | −2.00 | — | 108,000 | 0.779 | 0.455 | 1.90 | 28,900 | 20,500 | 5,730 | 1,330 |
| EXAMPLE 10 | −1.44 | — | 215,000 | 0.648 | 0.304 | 0.71 | 101,000 | 53,900 | 11,000 | 2,320 |
| EXAMPLE 11 | −1.54 | — | 156,000 | 0.622 | 0.300 | 1.05 | 75,500 | 48,200 | 11,200 | 2,300 |
| EXAMPLE 12 | −1.98 | — | 186,000 | 0.620 | 0.338 | 0.91 | 75,700 | 46,100 | 11,200 | 2,530 |
| EXAMPLE 13 | −1.76 | — | 157,000 | 0.661 | 0.362 | 1.17 | 82,200 | 39,800 | 10,100 | 2,280 |
| EXAMPLE 14 | −1.83 | — | 112,000 | 0.732 | 0.380 | 1.66 | 39,100 | 27,400 | 7,500 | 1,820 |
| EXAMPLE 15 | −2.44 | — | 79,700 | 0.588 | 0.251 | 1.59 | 33,300 | 27,100 | 8,070 | 1,820 |
| EXAMPLE 16 | −2.30 | — | — | 0.808 | 0.356 | 1.77 | 25,200 | 18,200 | 5,170 | 1,250 |
| EXAMPLE 17 | −1.22 | 48,000 | 192,000 | 0.607 | 0.367 | 0.88 | 12,800 | 5,790 | 1,340 | 321 |
| EXAMPLE 18 | −1.17 | — | 106,000 | 0.788 | 0.489 | 1.98 | 28,200 | 20,400 | 5,600 | 1,300 |
| EXAMPLE 19 | −0.67 | 80,000 | 184,000 | 0.634 | 0.305 | 0.90 | 87,600 | 51,800 | 12,000 | 2,600 |
| COMPARATIVE EXAMPLE 1 | −0.34 | 180,000 | 329,000 | 0.747 | 0.423 | 0.64 | 53,500 | 24,700 | 5,260 | 1,230 |
| COMPARATIVE EXAMPLE 2 | +0.41 | 55,000 | 179,000 | 0.790 | 0.429 | 1.17 | 14,900 | 7,140 | 1,570 | 342 |
| COMPARATIVE EXAMPLE 3 | +0.80 | — | 194,000 | 0.890 | 0.643 | 1.45 | 25,600 | 14,600 | 3,950 | 965 |
| COMPARATIVE EXAMPLE 4 | −4.35 | 13,000 | 33,700 | 0.658 | 0.242 | 3.38 | 6,120 | 3,240 | 821 | 231 |

(ANNOTATION) "—": NOT MEASURED

TABLE 4

| SIGN | SATURATION MAGNETO-STRICTION ($\lambda o$) ppm | INITIAL RELATIVE MAGNETIC PERMEABILITY ($\mu 0.4$) | MAXIMUM RELATIVE MAGNETIC PERMEABILITY ($\mu\infty$) | MAXIMUM MAGNETIC FLUX DENSITY ($\mu m$) T | RESIDUAL MAGNETIC FLUX DENSITY (B800) T | COERCIVE FORCE (Hz) A/m | EFFECTIVE RELATIVE MAGNETIC PERMEABILITY ($\mu o$) | | | |
|---|---|---|---|---|---|---|---|---|---|---|
| | | | | | | | 0.5 kHz | 1 kHz | 10 kHz | 100 kHz |
| EXAMPLE 1 | −0.83 | — | 89,200 | 0.729 | 0.265 | 1.52 | 9,220 | 4,490 | 1,120 | 290 |
| EXAMPLE 2 | −0.93 | — | 73,000 | 0.734 | 0.281 | 1.86 | 13,600 | 6,950 | 1,700 | 420 |
| EXAMPLE 3 | −0.50 | — | 40,400 | 0.687 | 0.147 | 1.80 | 12,200 | 6,450 | 1,660 | 460 |
| EXAMPLE 4 | −1.43 | — | 71,000 | 0.730 | 0.311 | 2.16 | 7,670 | 3,700 | 920 | 220 |
| EXAMPLE 5 | −0.44 | — | 24,400 | 0.752 | 0.143 | 2.57 | 5,390 | 2,780 | 750 | 205 |
| EXAMPLE 6 | −0.36 | — | 260,000 | 0.677 | 0.377 | 0.84 | 14,800 | 6,770 | 1,420 | 300 |
| EXAMPLE 7 | −1.00 | — | 41,400 | 0.765 | 0.296 | 3.43 | 14,700 | 11,700 | 4,180 | 944 |
| EXAMPLE 8 | −0.27 | — | 55,400 | 0.700 | 0.221 | 2.07 | 8,150 | 4,060 | 1,060 | 290 |
| EXAMPLE 9 | −2.00 | — | — | 0.773 | 0.321 | 3.64 | 15,100 | 12,100 | 4,270 | 1,010 |
| EXAMPLE 10 | −1.44 | — | — | 0.647 | 0.405 | 1.54 | 32,200 | 19,700 | 5,640 | 1,160 |
| EXAMPLE 11 | −1.54 | — | — | 0.616 | 0.357 | 1.81 | 26,900 | 18,400 | 5,370 | 1,130 |
| EXAMPLE 12 | −1.98 | — | — | 0.615 | 0.288 | 1.92 | 23,400 | 17,500 | 5,580 | 1,250 |
| EXAMPLE 13 | −1.76 | — | — | 0.656 | 0.258 | 2.52 | 18,400 | 14,400 | 4,930 | 1,140 |
| EXAMPLE 14 | −1.83 | — | — | 0.727 | 0.257 | 3.42 | 15,300 | 12,000 | 4,420 | 1,050 |
| EXAMPLE 15 | −2.44 | — | — | 0.586 | 0.568 | 3.11 | 26,000 | 8,570 | 1,210 | 207 |
| EXAMPLE 16 | −2.30 | — | — | 0.794 | 0.274 | 3.57 | 12,400 | 10,300 | 3,990 | 936 |
| EXAMPLE 17 | −1.22 | — | — | 0.609 | 0.244 | 1.34 | 8,830 | 4,180 | 979 | 222 |

TABLE 4-continued

| SIGN | SATURATION MAGNETO-STRICTION ($\lambda o$) ppm | INITIAL RELATIVE MAGNETIC PERMEABILITY ($\mu 0.4$) | MAXIMUM RELATIVE MAGNETIC PERMEABILITY ($\mu\infty$) | MAXIMUM MAGNETIC FLUX DENSITY ($\mu m$) T | RESIDUAL MAGNETIC FLUX DENSITY (B800) T | COERCIVE FORCE (Hz) A/m | EFFECTIVE RELATIVE MAGNETIC PERMEABILITY ($\mu o$) | | | |
|---|---|---|---|---|---|---|---|---|---|---|
| | | | | | | | 0.5 kHz | 1 kHz | 10 kHz | 100 kHz |
| EXAMPLE 18 | −1.17 | — | — | 0.775 | 0.236 | 4.36 | 11,000 | 9,320 | 3,680 | 940 |
| EXAMPLE 19 | −0.67 | — | 50,200 | 0.630 | 0.246 | 2.36 | 19,000 | 14,800 | 5,220 | 1,250 |
| COMPARATIVE EXAMPLE 1 | +0.34 | NOT MEASURABLE | NOT MEASURABLE | 0.727 | 0.070 | 5.55 | 3,930 | 3,410 | 1,580 | 470 |
| COMPARATIVE EXAMPLE 2 | +0.41 | NOT MEASURABLE | NOT MEASURABLE | 0.760 | 0.063 | 4.54 | 3,290 | 1,990 | 589 | 165 |
| COMPARATIVE EXAMPLE 3 | +0.80 | NOT MEASURABLE | NOT MEASURABLE | 0.808 | NOT MEASURABLE | NOT MEASURABLE | 2,590 | 2,050 | 1,720 | 630 |
| COMPARATIVE EXAMPLE 4 | −4.35 | — | 212,000 | 0.650 | 0.513 | 1.49 | 7,420 | 31,700 | 598 | 118 |

(ANNOTATION) "—": NOT MEASURED

TABLE 5

| SIGN | SATURATION MAGNETO-STRICTION ($\lambda s$) ppm | CHANGE RATE OF COERCIVE FORCE (Hc) | | |
|---|---|---|---|---|
| | | (a) BEFORE RESIN MOLDING A/m | (b) AFTER RESIN MOLDING A/m | CHANGE RATE (b)/(a) |
| EXAMPLE 1 | −0.83 | 1.04 | 1.52 | 1.46 |
| EXAMPLE 2 | −0.93 | 1.01 | 1.86 | 1.84 |
| EXAMPLE 3 | −0.50 | 0.53 | 1.80 | 3.42 |
| EXAMPLE 4 | −1.43 | 1.82 | 2.16 | 1.19 |
| EXAMPLE 5 | −0.44 | 1.33 | 2.57 | 1.93 |
| EXAMPLE 6 | −0.30 | 0.97 | 0.84 | 0.86 |
| EXAMPLE 7 | −1.00 | 1.90 | 3.43 | 1.80 |
| EXAMPLE 8 | −0.27 | 1.27 | 2.07 | 1.64 |
| EXAMPLE 9 | −2.00 | 1.90 | 3.64 | 1.91 |
| EXAMPLE 10 | −1.44 | 0.71 | 1.54 | 2.18 |
| EXAMPLE 11 | −1.54 | 1.05 | 1.81 | 1.72 |
| EXAMPLE 12 | −1.98 | 0.91 | 1.92 | 2.11 |
| EXAMPLE 13 | −1.76 | 1.17 | 2.52 | 2.16 |
| EXAMPLE 14 | −1.83 | 1.66 | 3.42 | 2.07 |
| EXAMPLE 15 | −2.44 | 1.59 | 3.11 | 1.96 |
| EXAMPLE 16 | −2.30 | 1.77 | 3.57 | 2.01 |
| EXAMPLE 17 | −1.22 | 0.88 | 1.34 | 1.51 |
| EXAMPLE 18 | −1.17 | 1.98 | 4.38 | 2.20 |
| EXAMPLE 19 | −0.07 | 0.90 | 2.36 | 2.63 |
| COMPARATIVE EXAMPLE 1 | +0.34 | 0.64 | 5.55 | 6.73 |
| COMPARATIVE EXAMPLE 2 | +0.41 | 1.17 | 4.54 | 3.88 |
| COMPARATIVE EXAMPLE 4 | −4.35 | 3.38 | 1.49 | 0.44 |

TABLE 6

| SIGN | SATURATION MAGNETO-STRICTION ($\lambda s$) ppm | CHANGE RATE OF MAXIMUM RELATIVE MAGNETIC PERMEABILITY ($\mu m$) | | |
|---|---|---|---|---|
| | | (c) BEFORE RESIN MOLDING | (d) AFTER RESIN MOLDING | CHANGE RATE (d)/(c) |
| EXAMPLE 1 | −0.83 | 145,000 | 89,200 | 0.62 |
| EXAMPLE 2 | −0.93 | 132,000 | 73,000 | 0.55 |
| EXAMPLE 3 | −0.50 | 255,000 | 40,400 | 0.16 |
| EXAMPLE 4 | −1.43 | 88,800 | 71,000 | 0.80 |
| EXAMPLE 5 | −0.44 | 139,000 | 24,400 | 0.18 |
| EXAMPLE 6 | −0.36 | 178,000 | 260,000 | 1.46 |
| EXAMPLE 7 | −1.00 | 76,800 | 41,400 | 0.54 |
| EXAMPLE 8 | −0.27 | 171,000 | 55,400 | 0.32 |
| EXAMPLE 19 | −0.67 | 184,000 | 50,200 | 0.27 |
| COMPARATIVE EXAMPLE 4 | −4.35 | 33,700 | 212,000 | 6.29 |

Turning to the saturation magnetostrictions ($\lambda s$) of the test specimens before resin molding shown in Table 3, Examples 1 to 19 have negative values in the range from "−2.44 ppm" to "−0.27 ppm", Comparative Examples 1 to 3 have positive values in the range from "+0.34 ppm" to "+0.80 ppm", and Comparative Example 4 has a value of "4.35 ppm". The initial relative magnetic permeability ($\mu 0.4$) and the maximum relative magnetic permeability ($\mu m$) tended to be basically higher as the saturation magnetostriction ($\lambda s$) was closer to zero. For example, Comparative Example 1 having a saturation magnetostriction of "+0.34 ppm" has an initial relative magnetic permeability of 180,000 and a maximum relative magnetic permeability of 325,000, which are high and excellent values, and hence it has been found that Comparative Example 1 is a soft magnetic material having suitable magnetic properties. However, turning to Comparative Example 1 (resin-molded test specimen) after resin molding shown in Table 4, the initial relative magnetic permeability and the maximum relative magnetic permeability are degraded to be not measurable, and hence it has been found that it is not preferable to use Comparative Example 1 in an environment where it is subject to a compression stress due to resin molding.

Turning to the coercive forces (Hc) with reference to Table 5 and FIG. 5, the coercive forces before resin molding of Examples 1 to 19 having saturation magnetostrictions of "at least −2.5 ppm and less than 0 ppm", Comparative Example 1 having a saturation magnetostriction of "+0.34 ppm", and Comparative Example 1 having a saturation magnetostriction of "+0.41 ppm" were not more than 2.0 (A/m). However, after resin molding, the coercive force of Comparative Example 1 increased 8.73-fold, and the coercive force of Comparative Example 2 increased 3.88-fold.

On the other hand, in Examples 1 to 19, although the change rate of the coercive force of Example 3 was 3.42, which was slightly large, it has been confirmable that all the change rates are smaller than that of Comparative Example 2, and a change in the coercive force of Example 6 is smaller than before resin molding. The coercive force before resin molding of Comparative Example 4 having a saturation magnetostriction of "−4.35 ppm" was 3.38 (A/m), which was larger than 2.0 (A/m). In Comparative Example 4, the coercive force was reduced to 1.49 (A/m), which was a 0.44-fold coercive force, after resin molding. However, given that the coercive force itself before resin molding is high, Comparative Example 4 may be significantly influenced by the coercive force before resin molding depending on the type of resin, a molding state, etc. Thus, although the coercive force was reduced after resin molding, it is considered to be not preferable to use Comparative Example 4 as the soft magnetic component for a torque sensor.

It has been found from the aforementioned results that the soft magnetic material having a saturation magnetostriction of "at least −4.0 ppm and less than 0 ppm" is effective for achieving improvements in the sensitivity and responsiveness of the torque sensor and a reduction in the hysteresis of the torque sensor when used for the soft magnetic component for a torque sensor since an undesirable increase in the coercive force (Hc) can be suppressed even if the soft magnetic material is subject to a compression stress due to resin molding. It has been found from FIG. 5 that when the saturation magnetostriction is "at least −4.0 ppm and less than 0 ppm, the shift direction of the coercive force after resin molding is a positive direction, and the coercive force after resin molding does not exceed 4.4 (A/m)". Furthermore, it has been found that when the saturation magnetostriction is "at least −2.5 ppm and less than 0 ppm", the above shift direction is a positive direction, and the coercive force after resin molding becomes not more than 2.0 (A/m) depending on the condition. In addition, it has been found that when the saturation magnetostriction is "at least −1.7 ppm and not more than −0.3 ppm", the coercive force after resin molding is likely to be not more than 2.0 (A/m).

Turning to the maximum relative magnetic permeability ($\mu$m) with reference, to Table 6 and FIG. 6, the maximum relative, magnetic permeabilities of Examples 1 to 8 having saturation, magnetostrictions of "at least −1.5 ppm and less than 0 ppm" except. Example 6 decreased 0.16-fold to 0.80-fold after resin molding. However, it is not a problem so that Examples 1 to 8 except Example 6 are used for the soft magnetic component for a torque sensor. Examples 1, 2, 4, and 7, for example, are preferable since the change rates before and after resin molding are at least 0.50, and it has been confirmable that Example 6 is more preferable since the maximum relative magnetic permeability has been changed to be larger than before resin molding. The maximum relative magnetic permeability of Comparative Example 4 having a saturation magnetostriction of "−4.35 ppm" was 33,700 before resin molding and 212,000 after resin molding, which is 6.29 times as large as that before resin molding, and hence it was changed to be larger and preferable. However, Comparative Example 4 is conceivably unsuitable for the soft magnetic component for a torque sensor, as described above.

It has been found from the aforementioned results that the soft magnetic material having a saturation magnetostriction of "at least −4.0 ppm and less than 0 ppm" is effective for achieving improvements in the responsiveness and resolution of the torque sensor when used for the soft magnetic component for a torque sensor since an undesirable decrease in the maximum relative magnetic permeability ($\mu$m) can be suppressed even if the soft magnetic material is subject to a compression stress due to resin molding. Furthermore, it has been found from FIG. 6 that when the saturation magnetostriction is "at least −4.0 ppm and less than 0 ppm, the maximum relative magnetic permeability after resin molding becomes at least 24,400".

Referring to Table 3 and Table 4, the rates at which the effective relative magnetic permeabilities ($\mu$e) of Examples 1 to 16, 18, and 19 were reduced before and after resin molding tended to be smaller as compared with Comparative Examples 1 and 2. Although Example 5 and Comparative Example 2 in which the test specimens have the same thickness as shown in Table 2 may not be significantly different in chemical component, Fe/(Ni+Fe) of Example 5 is 0.153, and Fe/(Ni+Fe) of Comparative Example 2 is 0.164, which is different. Before resin molding, Comparative Example 1 exhibited a larger value of each frequency than Example 5, but after resin molding, Example 5 exhibited a larger value of each frequency than Comparative Example 1. Thus, it has been found that degradation of the effective relative magnetic permeability due to resin molding is less in Example 5.

From the above, according to the present invention, changes in the magnetic properties of the soft magnetic material before and after resin molding can be reduced enough to use the soft magnetic material for the soft-magnetic component for a torque sensor, and hence it has been found that the soft magnetic component for a torque sensor having the magnetic properties effective for a torque sensor can be obtained. Further more, it has been found that a torque sensor, the high detection accuracy of which can be expected, can be obtained by using the soft magnetic component for a torque sensor.

What is claimed is:

1. A soft magnetic component for a torque sensor, which is formed by resin-molding a soft magnetic material that contains Ni, Fe in such an amount that Fe/(Fe+Ni) is within the range from 10.0% to 16.0% in terms of mass ratio, and 3.5% by mass to 7.5% by mass of M (the M represents one or more elements selected from among Mo, Nb, Cr, Cu, Ti, and W) and which has a saturation magnetostriction of at least −4.0 ppm and less than 0 ppm,
wherein the soft magnetic component for a torque sensor formed by resin-molding is a ring core or a yoke for the torque sensor.

2. The soft magnetic component for a torque sensor according to claim 1, wherein the M is Mo in an amount selected from a range of 3.5% by mass to 6.5% by mass.

3. The soft magnetic component for a torque sensor according to claim 1, wherein the M is Nb in an amount selected from a range of 5.0% by mass to 6.5% by mass.

4. The soft magnetic component for a torque sensor according to claim 1, wherein the M is Cr in an amount selected from a range of 3.5% by mass to 6.0% by mass.

5. The soft magnetic component for a torque sensor according to claim 1, wherein the M is a combination of Mo in an amount selected from a range of 3.5% by mass to 5.0% by mass and Cu in an amount selected from a range of 1.5% by mass to 2.5% by mass.

6. The soft magnetic component for a torque sensor according to claim 1, wherein the M is a combination of Mo in an amount selected from a range of 1.5% by mass to 6.0% by mass and Ti in an amount selected from a range of 0.5% by mass to 3.0% by mass.

7. The soft magnetic component for a torque sensor according to claim 1, wherein the M is a combination of Mo in an amount selected from a range of 1.0% by mass to 4.5% by mass and Nb in an amount selected from a range of 2.5% by mass to 5.0% by mass.

8. The soft magnetic component for a torque sensor according to claim 1, wherein the M is a combination of Mo in an amount selected from a range of 1.5% by mass to 4.5% by mass, Ti in an amount selected from a range of 1.0% by mass to 3.0% by mass, and W in an amount selected from a range of 0.2% by mass to 1.0% by mass.

9. The soft magnetic component for a torque sensor according to claim 1, wherein the M is a combination of Nb in an amount selected from a range of 2.5% by mass to 3.5% by mass, W in an amount selected from a range of 1.5% by mass to 2.5% by mass, and Ti in an amount selected from a range of 0.5% by mass to 1.5% by mass.

10. The soft magnetic component for a torque sensor according to claim 1, wherein the soft magnetic material has a coercive force of not more than 2.0 (A/m).

11. The soft magnetic component for a torque sensor according to claim 1, wherein the soft magnetic material has a maximum relative magnetic permeability of at least 100,000.

12. The soft magnetic component for a torque sensor according to claim 1, wherein the soft magnetic component for a torque sensor formed by resin-molding is the ring core for the torque sensor.

13. The soft magnetic component for a torque sensor according to claim 1, wherein the soft magnetic component for a torque sensor formed by resin-molding is the yoke for the torque sensor.

14. A torque sensor, comprises a ring core and a yoke, the ring core and the yoke are formed by resin-molding a soft magnetic material that contains Ni, Fe in such an amount that Fe/(Fe+Ni) is within a range from 10.0% to 16.0% in terms of mass ratio, and 3.5% by mass to 7.5% by mass of M (the M represents one or more elements selected from among Mo, Nb, Cr, Cu, Ti, and W) and which has a saturation magnetostriction of at least −4.0 ppm and less than 0 ppm.

15. The torque sensor according to claim 14, used in an electric power steering.

* * * * *